US009790360B2

(12) United States Patent
Puchalski et al.

(10) Patent No.: US 9,790,360 B2
(45) Date of Patent: Oct. 17, 2017

(54) OIL GEL FOR ASPHALT MODIFICATION AND REJUVENATION (71) Applicant: KRATON POLYMERS U.S. LLC, Houston, TX (US)

(72) Inventors: Sebastian Puchalski, Houston, TX (US); Robert Q. Kluttz, Houston, TX (US); Christopher M. Lubbers, Dana Point, CA (US)

(73) Assignee: Kraton Polymers U.S. LLC, Houston, TX (US)

( * ) Notice: Subject to any disclaimer, the term of this patent is extended or adjusted under 35 U.S.C. 154(b) by 84 days.

(21) Appl. No.: 14/984,842

(22) Filed: Dec. 30, 2015

(65) Prior Publication Data
US 2017/0190898 A1    Jul. 6, 2017

(51) Int. Cl.
*E01C 23/00* (2006.01)
*C08L 53/02* (2006.01)
*C08L 95/00* (2006.01)
*E01C 23/06* (2006.01)

(52) U.S. Cl.
CPC ............ *C08L 53/02* (2013.01); *C08L 95/00* (2013.01); *C08L 95/005* (2013.01); *E01C 23/065* (2013.01); *C08L 2555/34* (2013.01); *C08L 2555/64* (2013.01); *C08L 2555/84* (2013.01)

(58) Field of Classification Search
CPC ........ E01C 23/065; C08L 53/02; C08L 95/00; C08L 95/005; C08L 2555/34; C08L 2555/64; C08L 2555/84
USPC ................ 404/17, 72, 75, 77, 82, 83, 90–92
See application file for complete search history.

(56) References Cited

U.S. PATENT DOCUMENTS

| 3,231,635 | A | 1/1966 | Holden et al. |
| 3,244,664 | A | 4/1966 | Zelinski et al. |
| 3,251,905 | A | 5/1966 | Zelinski |
| 3,281,383 | A | 10/1966 | Zelinski et al. |
| 3,390,207 | A | 6/1968 | Moss et al. |
| 3,594,452 | A | 7/1971 | De La Mare et al. |

(Continued)

FOREIGN PATENT DOCUMENTS

| CN | 1049279369 A | 9/2015 |
| EP | 0387671 A1 | 9/1990 |

(Continued)

OTHER PUBLICATIONS

International Search Report for PCT/US2016/068710, dated Mar. 13, 2017.

*Primary Examiner* — Raymond W Addie
(74) *Attorney, Agent, or Firm* — Ekatherina Serysheva (57) ABSTRACT The present invention is an asphalt rejuvenator made from a specific styrenic block copolymer, bio-based oil or a bio-based oil blend, and an antioxidant system. The bio-based oil or a bio-based oil blend has a flash point of >230° C., and the asphalt rejuvenator has a maximum viscosity of <2000 cP at 180° C. when measured at 6.8/seconds shear rate. An alternate embodiment of the present invention is a pavement composition of RAP and/or RAS, asphalt rejuvenator, and virgin asphalt with and without a crosslinker. Lastly, the invention includes a method of making an asphalt rejuvenator composition referred to above, and blending it with RAP and fresh asphalt. An emulsion is also described and claimed comprising asphalt rejuvenator, water and an emulsifier.

22 Claims, 5 Drawing Sheets

(56) References Cited

U.S. PATENT DOCUMENTS

| | | |
|---|---|---|
| 3,598,887 A | 8/1971 | Darcy et al. |
| 3,692,874 A | 9/1972 | Farrar et al. |
| 3,733,255 A * | 5/1973 | Appell et al. ............ C02F 1/025 |
| | | 201/2.5 |
| 3,880,954 A | 4/1975 | Kahle et al. |
| 3,985,830 A | 10/1976 | Fetters et al. |
| 4,076,915 A | 2/1978 | Trepka |
| 4,104,332 A | 8/1978 | Zelinski |
| 4,145,322 A | 3/1979 | Maldonado et al. |
| 4,185,042 A | 1/1980 | Verkouw |
| 4,219,627 A | 8/1980 | Halasa et al. |
| 4,242,246 A | 12/1980 | Maldonado et al. |
| 4,379,891 A | 4/1983 | Haynes |
| 5,075,377 A | 12/1991 | Kawabuchi et al. |
| 5,272,214 A | 12/1993 | Custro et al. |
| 5,681,895 A | 10/1997 | Bening et al. |
| 5,755,865 A | 5/1998 | Lukens |
| 6,074,469 A | 6/2000 | Collins et al. |
| 7,560,503 B2 | 7/2009 | St. Clair et al. |
| 7,728,074 B2 | 6/2010 | Kluttz et al. |
| 7,811,372 B2 | 10/2010 | Nigen-Chaidron et al. |
| 7,951,417 B1 * | 5/2011 | Wen ....................... C04B 26/003 |
| | | 427/186 |
| 8,133,316 B2 | 3/2012 | Poncelet et al. |
| 9,115,296 B2 | 8/2015 | Kluttz et al. |
| 9,637,615 B2 * | 5/2017 | Fini ....................... C09D 191/00 |
| 2008/0210126 A1 | 9/2008 | Apeagyei |
| 2011/0294927 A1 * | 12/2011 | Williams ................ C08L 23/06 |
| | | 524/59 |
| 2012/0167802 A1 | 7/2012 | Huh |
| 2015/0240081 A1 | 8/2015 | Grady et al. |

FOREIGN PATENT DOCUMENTS

| | | |
|---|---|---|
| EP | 0413294 A2 | 2/1991 |
| EP | 9422931 A1 | 10/1994 |
| WO | 2015070180 A1 | 5/2015 |

* cited by examiner

OIL GEL FOR ASPHALT MODIFICATION AND REJUVENATION

FIELD OF THE INVENTION

The present invention is an asphalt rejuvenator (oil gel) comprising a styrenic block copolymer, bio-based oil or a bio-based oil blend capable of fully dissolving the styrenic block copolymer, and an antioxidant system that is useful for modifying and rejuvenating asphalt binder from, reclaimed asphalt pavement. The asphalt for pavement applications is preferably from reclaimed asphalt pavement (RAP) and/or recycled asphalt shingles (RAS), virgin asphalt (pitch and/or sand/aggregate). The asphalt rejuvenator exhibits very low rotational viscosity making it possible to incorporate higher than normal polymer loading into virgin asphalt/RAP and/or RAS compositions, while keeping the asphalt rejuvenator pumpable at normal processing conditions. The asphalt rejuvenator includes a styrenic block copolymer containing high vinyl diblock copolymer, and either a high vinyl linear triblock copolymer, a high vinyl multiarm block copolymer, or mixtures thereof, at a ratio of diblock copolymer to linear triblock copolymer, multiarm block copolymer or mixtures thereof, of greater than 1 to 1, where the copolymers comprise at least one block of a monoalkenyl arene and at least one block of a conjugated diene. While the asphalt rejuvenator can be used with virgin asphalt, it is not economical compared with RAP and/or RAS, with virgin asphalt mixture.

The broadest scope of the present invention is an asphalt rejuvenator made from the above described styrenic block copolymer and bio-based oil or a bio-based oil blend as will be explained later, and an antioxidant system. Another embodiment of the present invention is a composition of RAP and/or RAS, virgin asphalt, and asphalt rejuvenator, with other optional ingredients such as crosslinker described below in more detail. Lastly the present invention also pertains to a method of making a pavement composition comprising asphalt rejuvenator mixed with virgin asphalt, RAP and/or RAS, and optionally a crosslinker.

Another useful application of the asphalt rejuvenator is for emulsion applications such as for sealing, coating and micro surfacing for pavement applications. Emulsion compositions have the asphalt rejuvenator, as described above, plus other additional ingredients such as water, crosslinker, and an emulsifier.

BACKGROUND OF THE INVENTION

U.S. Pat. No. 7,728,074 to Kluttz et al. and assigned to Kraton Polymers LLC discloses a block copolymer for uniformly mixing with a bitumen binder for hot mix asphalt paving applications. The block copolymer is a mixture of a diblock and triblock styrenic block copolymer where the diblock to triblock ratio is greater than 1:1. This patent is hereby incorporated by reference.

It is known to use 20 to 30 wt. % of reclaimed asphalt in prior art compositions. These compositions rejuvenate the RAP (reclaimed asphalt pavement) with oil. U.S. Pat. No. 8,133,316 to Poncelet et al. and assigned to Shell oil Company describes a process for mixing RAP with virgin asphalt composition. The heated RAP is mixed with mineral or vegetable oil such as rape seed or palm oil, or an animal oil, up to 10 wt. %. Thereafter it is mixed with the virgin asphalt composition (asphalt and gravel/sand). No bio-based oil, nor styrenic block copolymer is disclosed.

U.S. Pat. No. 7,560,503 to St. Clair et al. and assigned to Kraton Polymers LLC discloses a gel made from a blend of 1 part styrenic block copolymer and 3 to 20 parts oil. The styrenic block copolymer can be a combination of a high vinyl diblock and a high vinyl triblock copolymer.

U.S. Pat. No. 9,115,296 to Kluttz et al. and assigned to Kraton Polymers LLC relates to bituminous emulsions. The styrenic block copolymer is a mixture of a diblock and triblock styrenic block copolymer where the diblock to triblock ratio is greater than 1:1. This patent is hereby incorporated by reference.

The use of SBS (styrene-butadiene-styrene) in fresh asphalt blends is known to improve permanent deformation at high temperatures, improve crack resistance at intermediate and low temperatures, and improve age resistance through brittleness. Nevertheless, the industry continually seeks asphalt payment that employs recycled asphalt with polymer and oil that results in a long lasting pavement.

SUMMARY OF THE INVENTION

Asphalt, also known as bitumen, tar, or pitch, is a sticky, black and highly viscous liquid or semi-solid form of petroleum (known as pitch) blended with sand and/or aggregate gravel. Pitch may be found in natural deposits or may be a refined product from petroleum bottom distillates.

RAP—reclaimed asphalt pavement—is reclaimed from old road surfaces and consists of aggregate and aged binder (binder is pitch, tar, asphalt). RAS—reclaimed asphalt roofing shingles is reclaimed from old, aged roofing shingles containing asphalt, and very fine stone granules, and a three dimensional web generally made from fiberglass.

The asphalt rejuvenator is a blend of the styrenic block copolymer described herein and bio-based oil or a blend of bio-based oil with up to 10% and preferable no more than about 5 wt. %, and more preferably less than about 3 wt. % other oils as explained later, having the capability of fully dissolving at least 40 wt. % of the styrenic block copolymer, and an antioxidant system. For the bio-based oil and the bio-based oil blend, a high flash point temperature greater than or equal to 230° C. is suitable, as determined by Flash Point: AASHTO T48-06 or ASTM D92-05a.

In the broadest sense, the present invention is an asphalt rejuvenator defined as made from the above described styrenic block copolymer, bio-based oil (or bio-based oil blends), and an antioxidant system.

In the broadest sense, another embodiment of the present invention is a pavement composition of asphalt rejuvenator, virgin asphalt (pitch and/or sand/aggregate), RAP and/or RAS, and optionally a crosslinker.

Further, the invention in the broadest sense is a method of making a pavement composition comprising blending asphalt rejuvenator, virgin asphalt, RAP and/or RAS, and optional crosslinker.

The asphalt rejuvenator has three requirements that must be met, namely: 1) the oil must have a high flash point (≥230° C.) for safety and environmental concerns, 2) a higher concentration of block copolymer (40-65 wt. % of the total oilgel composition) to provide more strength, and 3) a low viscosity asphalt rejuvenator with an antioxidant system (a maximum viscosity of 2000 cP at 180° C., when measured at 6.8/seconds shear rate, at the time it is manufactured) to maintain it in a pumpable state. It is preferred that the pavement composition (without rejuvenator) contains about 35 to about 75 wt. % RAP and/or RAS, and from 75 to 35 wt. % virgin asphalt (pitch and/or sand/aggregate). More preferably the amount of RAP and/or RAS is from about 40 to about 50 wt. %, with the virgin asphalt being about 60 to about 50 wt. % (total is 100 wt. %).

Lastly the present invention is also directed to an asphalt rejuvenator emulsion comprising the asphalt rejuvenator, bitumen, water, crosslinker, and emulsifier. The amount of styrenic block copolymer varies for the asphalt rejuvenator, but generally it is desirable to have 4 to 9 wt. % styrenic block copolymer in the mixture of the asphalt rejuvenator and the bitumen. For example, if the asphalt rejuvenator is 40 wt. % styrenic block copolymer, then the amount of asphalt rejuvenator in the bitumen/rejuvenator mixture is from about 16 wt. % to about 36 wt. %, with the remainder being bitumen. The bitumen/rejuvenator mixture is conducted at a temperature of about 180 to 220° C. for about 30 minutes to about 4 hours. Then about 0.05 to about 1.0 wt. % cross-linker, based on 100 wt. % of the bitumen/asphalt rejuvenator is added to crosslink the polymer. Then about 50 to 66 wt. % of the crosslinked bitumen/rejuvenator is emulsified with 50-34 wt. % water/emulsifier. The water/emulsifier contains about 0.2 to about 3.0 wt. % emulsifier.

BRIEF DESCRIPTION OF THE DRAWINGS

The following descriptions of the figures are only meant to further illustrate the invention.

DESCRIPTION OF THE PREFERRED EMBODIMENTS

The ranges set forth herein are meant to include not only the end numbers of each range but also every conceivable number there between, as that is the very definition of a range. The block copolymer composition to be used in the above noted asphalt rejuvenator of the present invention comprises:

(i) a diblock copolymer comprising one block of a monoalkenyl arene and one block of a conjugated diene having a peak molecular weight from about 30,000 to about 78,000 and a vinyl content from about 35 to about 80 mol percent based on the number of repeat monomer units in the conjugated diene block, and (ii) one or more block copolymers comprising at least two blocks of monoalkenyl arene and at least one block of conjugated diene, said block copolymers selected from linear triblock copolymers having a peak molecular weight that is about 1.5 to about 3.0 times the peak molecular weight of the diblock copolymer (i) and a vinyl content from about 35 to about 80 mol percent based on the number of repeat monomer units in the conjugated diene block, multiarm coupled block copolymers having a peak molecular weight that is about 1.5 to about 9.0 times the peak molecular weight of the diblock copolymer (i) and a vinyl content from about 35 to about 80 mol percent based on the number of repeat monomer units in the conjugated diene block, and mixtures thereof, and the ratio of i to ii is greater than 1:1.

While hydrogenation of block copolymers is well known in the art, the block copolymers of the present invention are in substantially unhydrogenated form. Hydrogenated styrenic block copolymers are to be avoided.

In one preferred embodiment of the present invention, the diblock copolymer is of the formula A-B, the linear triblock copolymer is of the formula A-B-A and the multiarm coupled block copolymer is of the formula $(A-B)_nX$, such that A is a monoalkenyl arene block, B is a conjugated diene block, n is an integer from 2 to 6 and X is the residue of a coupling agent. When the multiarm coupled block copolymers of the formula $(A-B)_nX$ are utilized, n will preferably be an integer from 2 to 4, with 2 being the most preferred.

While the monoalkenyl arene block may be any monovinyl aromatic hydrocarbon known for use in the preparation of block copolymers such as styrene, o-methylstyrene, p-methyl styrene, p-tert-butyl styrene, 2,4-dimethyl styrene, alpha-methyl styrene, vinylnaphthalene, vinyltoluene and vinylxylene or mixtures thereof, the most preferred monovinylaromatic hydrocarbon for use in the present invention is styrene, which is used as a substantially pure monomer or as a major component in mixtures with minor proportions of other structurally related vinyl aromatic monomer(s) such as o-methylstyrene, p-methylstyrene, p-tert-butylstyrene, 2,4-dimethylstyrene, a-methylstyrene, vinylnaphtalene, vinyltoluene and vinylxylene, i.e., in proportions of up to 10% by weight. The use of substantially pure styrene is most preferred in the present invention.

Similarly, the conjugated diene block may be any conjugated diene known for use in the preparation of block copolymers provided that the conjugated diene has from four to eight carbon atoms. Preferably, the conjugated diene used for the preparation of the conjugated diene blocks is a butadiene monomer or an isoprene monomer that is substantially pure monomer or contains minor proportions, up to 10% by weight, of structurally related conjugated dienes, such as 2,3-dimethyl-1,3-butadiene, 1,3-pentadiene and 1,3-hexadiene. Preferably, substantially pure butadiene or substantially pure isoprene is utilized for the preparation of the conjugated diene blocks, with substantially pure butadiene being the most preferred. Note that the conjugated diene block may also comprise a mixture of butadiene and isoprene monomers.

As used herein with regard to the block copolymers of the present invention, the term "molecular weights" refers to the true molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights".

The peak molecular weight of each monoalkenyl arene block is from about 10,000 to about 25,000, preferably from about 12,000 to about 20,000. In an alternative embodiment, the peak molecular weight is from about 14,000 to about 18,000.

Each diblock copolymer utilized in the present invention will have a peak molecular weight from about 30,000 to about 78,000, preferably from about 48,000 to about 78,000. The peak molecular weight of the linear triblock copolymers and/or multiarm coupled block copolymers (ii) is dependent upon the peak molecular weight of the diblock copolymers (i) utilized. More specifically, the peak molecular weight of the triblock copolymers (ii) will range from about 1.5 to about 3.0 times the peak molecular weight of the diblock copolymer (i). Preferably, in those embodiments where the block copolymer (ii) is a linear triblock copolymer, the peak molecular weight of the linear triblock copolymers will range from about 1.8 to about 2.5 times the peak molecular weight of the diblock copolymer (i). The peak molecular weight of the multiarm coupled block copolymers (ii) will range from about 1.5 to about 9.0 times the peak molecular weight of the diblock copolymer (i). In those embodiments where the block copolymer (ii) is a multiarm coupled block copolymer, the peak molecular weight will preferably range from about 1.8 to about 5.0 times the peak molecular weight of the diblock copolymer (i).

It will be appreciated that the term "vinyl content" has been used to describe the polymer product that is made when 1,3-butadiene is polymerized via a 1,2-addition mechanism. The result is a monosubstituted olefin group pendant to the polymer backbone, a vinyl group. In the case of anionic polymerization of isoprene, insertion of the isoprene via a 3,4-addition mechanism affords a geminal dialkyl C=C moiety pendant to the polymer backbone. The effects of 3,4-addition polymerization of isoprene on the final properties of the block copolymer will be similar to those from 1,2-addition of butadiene. When referring to the use of butadiene as the conjugated diene monomer, it is preferred that about 35 to about 80 mol percent of the condensed butadiene units in the polymer block have a 1,2-addition configuration. Preferably, from about 46 to about 70 mol percent of the condensed butadiene units should have 1,2-addition configuration, even more preferably from about 50 to about 65 mol percent of the butadiene units should have 1,2-addition configuration, and still even more preferably from about 52 to about 65 mol percent of the butadiene units should have 1,2-addition configuration. When referring to the use of isoprene as the conjugated diene, it is also preferred that about 35 to 80 mol percent of the condensed isoprene units in the block have 3,4-addition configuration. Preferably, from about 46 to about 70 mol percent of the condensed isoprene units in the block have 3,4-addition configuration, even more preferably from about 50 to about 65 mol percent of the isoprene units should have 3,4-addition configuration, and still even more preferably from about 52 to about 65 mol percent of the butadiene units should have 1,2-addition configuration.

The monoalkenyl arene content of the block copolymers (in the present case with regard to each individual diblock copolymer, linear triblock copolymer or multiarm coupled block copolymer) is suitably from about 10 to about 55% by weight, based on the total block copolymer. Preferably, the content of monoalkenyl arene of the copolymers will be from about 15 to about 45% by weight, more preferably from about 22 to about 37% by weight, and most preferably from about 25 to about 35% by weight, based on the total weight of the copolymer.

The styrenic block copolymer compositions of the present invention will have a melt flow rate or melt index greater than 15 g/10 min. For purposes of the block copolymers utilized of these embodiments, the term "melt index" is a measure of the melt flow of the polymer according to ASTM D 1238, under condition G at 200° C. at 5 kg load. It is expressed in units of grams of polymer melt passing through an orifice in 10 minutes. Broadly, the block copolymer compositions of the present invention have a melt index greater than 15 grams/10 min. Preferably, the melt index will range from greater than 15 to about 50 grams/10 min., more preferably from about 16 to about 35 grams/10 min.

As noted above, the block copolymer composition utilized in the present invention may comprise a mixture of diblock copolymer and either a linear triblock copolymer, a multiarm coupled block copolymer, or mixtures thereof. Preferably, the combination of diblock copolymer and multiarm coupled block copolymer is used. When the block copolymer composition comprises a mixture of diblock copolymer and either a linear triblock copolymer, a multiarm coupled block copolymer, or a mixture thereof, the ratio of the diblock copolymer to linear triblock copolymer, multiarm coupled block copolymer or mixture thereof will be greater than about 1:1, preferably equal to or greater than about 3:2. In a particularly preferred embodiment, the ratio of the diblock copolymer to linear triblock copolymer, multiarm coupled block copolymer, or mixture thereof will be from about 3:2 to about 10:1 with the most preferred ratio being from about 4:1 to about 7:3. In other words, in the broadest sense of the present invention, when the block copolymer composition comprises a diblock copolymer and either a linear triblock copolymer, a multiarm coupled block copolymer, or a mixture thereof, the linear triblock copolymer, multiarm coupled block copolymer, or mixture thereof will always be present in an amount less than that of the diblock copolymer (e.g., the linear triblock copolymer, multiarm coupled block copolymer, or mixture thereof will be present in the block copolymer composition in an amount of at most 49.9% by weight, preferably at most 40% by weight).

In a still further embodiment of the present invention, the objective is to produce a polymer in which the ratio of the diblock copolymer to linear triblock copolymer, multiarm coupled block copolymer, or mixture thereof is equal to or greater than 3:2, the vinyl content of each copolymer is from about 35 mol percent to about 80 mol percent based on the number of repeat monomer units in the conjugated diene block of the copolymer, and the peak molecular weights of the diblock and linear triblock copolymer, multiarm coupled block copolymer, or mixtures thereof are such that the weighted average molecular weights of the diblock copolymer and other block copolymer are less than 100,000. Take for example a composition containing a diblock copolymer (A-B) and a multiarm coupled block copolymer ((A-B)2x)

having a ratio of diblock copolymer to multiarm coupled block copolymer of 3:2. When the peak molecular weight of the diblock is 55,000, the peak molecular weight of the multiarm coupled block copolymer will be 110,000. Accordingly, the block copolymer composition will comprise 60% diblock copolymer and 40% multiarm coupled block copolymer. Therefore, 55,000×0.60 is equal to 33,000 while 110,000×0.40 is equal to 44,000. The sum of 33,000 and 44,000 gives the weighted average molecular weight of the block copolymer composition. In this particular example, the weighted average molecular weight is 77,000, less than 100,000.

As used throughout the present specification, the term "diblock copolymer", references that proportion of free diblock which is finally present in the applied block copolymer composition. It will be appreciated that when the block copolymer composition is prepared via a full sequential polymerization, no material detectable amounts of unreacted components will occur. In this situation, the finally desired amount of diblock can be adjusted to achieve the amount of diblock necessary for the present invention. Accordingly, in the present invention, when the block copolymer composition comprises a diblock copolymer in combination with a linear triblock copolymer made by full sequential polymerization, the amount of monoalkenyl arene added in the final step of preparing the block copolymer can be adjusted to limit the total amount of triblock copolymer or in the alternative, a sufficient amount of the diblock copolymer can be added to the fully polymerized linear triblock copolymer to achieve the necessary ratio.

When the block copolymers are prepared via initial preparation of intermediate living diblock copolymers, which are subsequently coupled by means of a multivalent coupling agent, the initial diblock content will be determined by the coupling efficiency. Normally in the preparation of most block copolymers, a coupling efficiency in the range of from 80 wt. % to 97 wt. % is desirable. This means that uncoupled diblock and/or unreacted components comprises 20 to 3 wt. %, respectively. Since the uncoupled diblock is generally the elephant in the room since it makes up the largest wt. %, herein after this component will be referred to merely as uncoupled diblock even though it may have a small amount of unreacted components.

In the present invention, it is possible to utilize polymers having a coupling efficiency of up to 50%. Preferably, there is an even lower degree of coupling (equal to or less than 40% coupling efficiency). For purposes of the present invention, the phrase "coupling efficiency" refers to the number of molecules of coupled diblock copolymer divided by the number of molecules of coupled polymer plus the number of molecules of uncoupled polymer. For example, if a coupling efficiency is 80 wt. %, then the polymer will contain 20 wt. % diblock copolymer and any unreacted components such as monomers or polymers. This is well known to those of ordinary skill in the art.

The block copolymer compositions utilized in the present invention may be prepared by any method known in the art including the well known full sequential polymerization method, optionally in combination with reinitiation, and the coupling method, as illustrated in e.g. U.S. Pat. No. 3,231,635; U.S. Pat. No. 3,251,905; U.S. Pat. No. 3,390,207; U.S. Pat. No. 3,598,887, U.S. Pat. No. 4,219,627, EP 0413294 A2, EP 0387671 B1, EP 0636654 A1 and WO 94/22931, each incorporated herein by reference in their entirety.

The block copolymers may therefore, for example, be prepared by coupling at least two diblock copolymer molecules together. The coupling agent may be any di- or polyfunctional coupling agent known in the art, for example, dibromoethane, diethyl adipate, divinylbenzene, dimethyldichlorosilane, methyl dichlorosilane, silicon tetrachloride and alkoxy silanes (U.S. Pat. No. 3,244,664, U.S. Pat. No. 3,692,874, U.S. Pat. No. 4,076,915, U.S. Pat. No. 5,075,377, U.S. Pat. No. 5,272,214 and U.S. Pat. No. 5,681,895), polyepoxides, polyisocyanates, polyimines, polyaldehydes, polyketones, polyanhydrides, polyesters, polyhalides (U.S. Pat. No. 3,281,383); diesters (U.S. Pat. No. 3,594,452); methoxy silanes (U.S. Pat. No. 3,880,954); divinyl benzene (U.S. Pat. No. 3,985,830); 1,3,5-benzenetricarboxylic acid trichloride (U.S. Pat. No. 4,104,332); glycidoxytrimethoxy silanes (U.S. Pat. No. 4,185,042); and oxydipropylbis(trimethoxy silane) (U.S. Pat. No. 4,379,891).

In general, the polymers useful in the present invention may be prepared by contacting the monomer or monomers with an organoalkali metal compound in a suitable solvent at a temperature within from about −150° C. to about 300° C., preferably at a temperature within the range of from about 0° C. to about 100° C. Particularly effective polymerization initiators are organolithium compounds having the general formula RLi wherein R is an aliphatic, cycloaliphatic, alkyl-substituted cycloaliphatic, aromatic or alkyl-substituted aromatic hydrocarbon radical having from 1 to 20 carbon atoms of which sec butyl is preferred. Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Accordingly, suitable solvents include aliphatic hydrocarbons such as butane, pentane, hexane and heptane, cycloaliphatic hydrocarbons such as cyclopentane, cyclohexane and cycloheptane, alkyl-substituted cycloaliphatic hydrocarbons such as methylcyclohexane and methylcycloheptane, aromatic hydrocarbons such as benzene and the alkyl-substituted hydrocarbons such as toluene and xylene, and ethers such as tetrahydrofuran, diethylether and di-n-butyl ether. Preferred solvents are cyclopentane or cyclohexane.

Techniques to enhance the vinyl content of the conjugated diene portion are well known and may involve the use of polar compounds such as ethers, amines and other Lewis bases and more in particular those selected from the group consisting of dialkylethers of glycols. Most preferred modifiers are selected from dialkyl ether of ethylene glycol containing the same or different terminal alkoxy groups and optionally bearing an alkyl substituent on the ethylene radical, such as monoglyme, diglyme, diethoxyethane, 1,2-diethoxypropane, 1-ethoxy-2,2-tert-butoxyethane, of which 1,2-diethoxypropane is most preferred.

The asphalt rejuvenator is a blend of the styrenic block copolymer described above, bio-based oil or oil blend capable of supporting (fully dissolving) all of the above noted styrenic block copolymer (at least 40 wt. % styrenic block copolymer, about 1-2 wt. % antioxidant and the reminder bio-oil) and meet the viscosity requirement and flash point requirements set forth below. Bio-based oils are, for example, linseed oil, olive oil, peanut oil, corn oil, palm oil, or canola oil, or soybean oil, or tall oil. The preferred oil is linseed oil (otherwise known as flaxseed oil) or linseed oil blends that are at least about 90 wt. % linseed oil and more preferably 95 wt. % linseed oil, and up to about 5 to about 10 wt. % other oil(s). For purposes of clarity linseed oil has more than 50 wt. % of said omega 3 fatty acid and with about 10 to about 20 wt. % each omega 6 and omega 9 fatty acids. Linseed oil is understood to contain about 6 to about 9 wt. % saturated fatty acids, about 10 to about 22 wt. % mono-saturated fatty acids, about 68 to about 89 wt. % polyunsaturated fatty acids, wherein about 56 to about 71 wt. % are omega 3 fatty acids, about 12 to about 18 wt. % are omega 6 fatty acids, and about 10 to about 22 wt. % are omega 9 fatty acids. Linseed oil has a flash point that ranges from 300 to 320° C. The blend of linseed oil and one or more other bio-based oils, such as olive oil, peanut oil, corn oil, palm oil, or canola oil, or soybean oil, or tall oil is within the scope of the invention, so long as the blend of oils has a flash point ≥230° C., and the asphalt rejuvenator has a maximum viscosity of 2000 cP at 180° C. when measured at a shear rate of 6.8/seconds (at the time it is manufactured) as determined by ASTM D4402 or ASHTO T 316, and is compatible with the styrenic block copolymer, wherein the oil in the asphalt rejuvenator fully dissolves at least about 40 wt. % styrenic block copolymer, based on 100 wt. rejuvenator. One of the primary functions of a rejuvenator is to soften the highly oxidized and brittle asphalt coming from RAP. If the rejuvenator itself becomes overly viscous, adding it defeats the purpose. Some bio-based oils are not capable of supporting 40-65 wt. % of the above noted styrenic block copolymer on their own. For example both corn oil and soybean oil are incapable of supporting 40 wt. % of the above polymer blend when no other bio-based oil is employed. However their use with linseed oil as a blend, for example, is suitable.

The asphalt rejuvenator is typically within the range of at least 40 to about 65 wt. % styrenic block copolymer and 60 to about 35 wt. % oil, when the antioxidant is not considered. Because the amount of antioxidant is only about 1 to 2 wt. %, even when considering the total composition of the asphalt rejuvenator, these percentages change only slightly.

The antioxidant system may be added during or after the mixing of the oil and styrenic block copolymer to reduce the rate of oxidation. It maintains the rejuvenator properties as close to original as possible. It also prevents the oilgel from excessive polymerization making it possible for the oil gel to be produced and stored at elevated temperatures. Antioxidants are present in an amount from about 0.1 wt. % to about 5 wt. %, based on the total weight of all asphalt rejuvenator components, and preferably 0.3 to 2 wt. %, and more preferably 1 to 2 wt. %. Primary antioxidants, secondary antioxidants, and carbon radical scavengers are generally desired components in the present invention, but carbon radical scavengers are not mandatory. Most antioxidants fall into the category of primary and secondary antioxidants and have different functions due to different chemical structures. A primary antioxidant is typically a hindered phenol or arylamines. Primary antioxidants scavenge alkoxy radicals and peroxy radicals. Many primary antioxidants that are compatible with styrenic block copolymers may be incorporated into the compositions of the present invention. Primary antioxidants sold under the trade name, Irganox from BASF may be suitable, such as 1010, 1076, and 1330, or Ethanox 330 from Albemarle Co. and Vanox 1001 and 1081 from Vanderbilt Chemicals LLC. Also butylated hydroxytoluene ($C_{15}H_{24}O$) is an acceptable primary antioxidant. It is commercially available from Eastman Chemical Co. or from Cayman Chemical Co. under the tradename Tenox. These primary antioxidants are employed at 0.3-1.5 wt. % and preferably from 0.5-1 wt. %.

Secondary antioxidants may also be used along with the Primary antioxidants. Secondary antioxidants are typically phosphites and thiosynergists. Secondary antioxidants scavenge hydroperoxides which are generated during the autoxidation cycle of a polymer exposed to heat and oxygen. Various compositions sold under the trade name Irgafos, may be suitable and are likewise manufactured by BASF. Irgafos 168 and the like are suitable for the present invention. These secondary antioxidants are employed at 0.5-2.5 wt. % and preferably from 0.5 to 2 wt. %

Carbon radical scavengers are considered to be a third category of antioxidant. Additionally, carbon radical scavengers for example under the tradename—Sumilizer, produced by Sumitomo Chemical may be used.

The RAP and/or RAS to virgin asphalt (pitch and/or sand/aggregate) is at least 1 part by weight RAP/RAS and 2 parts by weight virgin asphalt, and preferably 1 part by weight RAP/RAS to 1 part by weight virgin asphalt, and even 1 part by weight virgin asphalt to 2.5 parts by weight RAP/RAS.

The RAP is crushed and screened to appropriate paving gradation. Typically RAP is crushed and screened to provide a final mix gradation meeting AASHTO hot mix asphalt (HMA) gradation requirements.

Virgin asphalt is a mixture of bitumen and aggregate (coarse, fine and filler). For a paving composition it is generally a mixture following established specifications. The amounts of each component vary depending on supplier and location and traffic load and temperature range the paving composition is subject to and the thickness of paving layer. Generally virgin asphalt comprises about 4 to about 7 wt % bitumen and about 96 to about 93 wt. % aggregate.

Generally the aggregate size for the paving composition follows specification detailed in AASHTO M 43-05 (2013) "Sizes of Aggregate for Road and Bridge Construction", which provides detailed ranges for coarse aggregate depending on nominal aggregate size and AASHTO M 29-12 "Fine Aggregate for Bituminous Paving Mixtures", which covers fine aggregate for use in bituminous paving materials. Additionally, AASHTO M17-11 (2015) "Mineral Filler for Bituminous Paving Mixtures" details mineral filler added as a separate ingredient for use in bituminous paving mixtures.

Other optional ingredients may be added during the process of the present invention, including, but not limited to, recycled asphalt shingles (RAS), crosslinker, resins, stabilizers, fillers (such as talc, calcium carbonate, and carbon black), polyphosphoric acid, flame retardants, and ground tire rubber. The amount of such optional ingredients added can range from 0 to about 10% by weight, based on the total weight of all the components, namely asphalt rejuvenator, virgin asphalt, RAP and/or RAS, and other optional ingredients.

An extensive range of additives have been used for the purpose of "curing" or "crosslinking" the asphalt rejuvenator (styrenic block copolymer, oil and an antioxidant system) and virgin bitumen prior to blending the composition with RAP. These additions include known sulfur crosslinking agents and sulfur-containing crosslinking agents. Sulfur has long been known to be added to polymer modified bitumens (asphalt) to strengthen and accelerate the polymer-bitumen bonding and curing process. See, for example, U.S. Pat. No. 4,145,322 and U.S. Pat. No. 4,242,246. While sulfur itself is relatively safe, the reaction between sulfur, the asphalt rejuvenator and virgin asphalt generates hydrogen sulfide ($H_2S$) which is extremely hazardous. When crosslinker is added as an optional ingredient, it can range from 0.005 to 2.0 wt. % of the total weight of virgin asphalt and rejuvenator, and preferably 0.05 to 0.15 wt. %, while stirring the ingredients (asphalt rejuvenator and virgin asphalt) together for about 3-4 hours at about 180° C. Sulfur is a preferred suitable crosslinking agent because it is abundantly available and relatively inexpensive compared to other crosslinkers.

From an environmental and safety standpoint, there is some desire to eliminate sulfur and sulfur containing crosslinking agents which aid in the curing of paving compositions. Another approach to crosslinking is to use heat for an extended time to crosslink the polymer and oil in the asphalt rejuvenator, and the virgin asphalt. For example, stirring the asphalt rejuvenator and the virgin asphalt together for about 10 to 30 hours at about 200° C. will also crosslink the virgin asphalt, and asphalt rejuvenator. Although this process is sulfur crosslinker free, it takes much more time and at a higher temperature which may degrade the styrenic block copolymer in the asphalt rejuvenator.

Reclaimed asphalt is generally a local product obtained when local governments (or their subcontractors) mill up a bad section of pavement to lay down new asphalt or a blend of RAP and/or RAS, and new virgin asphalt. The composition of RAP/RAS varies with the local governments and depends on where the bitumen came from (from a tar pit or from petroleum bottoms, for example) and the type of sand or aggregate gravel initially employed. But any type of RAP/RAS is suitable for use in the present invention.

Reclaimed Asphalt Shingles (RAS) is generally a local product obtained from shingle manufacturers disposing of scrap production material or from old roofs. RAS is typically composed of hard oxidized pitch, fiberglass mat and fine aggregate. Small amounts of RAS such as about 10 wt. % of the total wt. of RAS/RAP, and more preferably about 5 or less wt. % of the RAS/RAP are suitable.

The amount of asphalt rejuvenator needed to make a suitable product of the present invention depends on the service life of the RAP, and the conditions such as the temperature the RAP was exposed to during its lifetime. U.V. rays from the sun and oxidation of the RAP due to temperature exposure makes the RAP brittle and prone to cracking. RAP material should contain very little moisture to ensure quick and uniform heating of the material. RAP material is typically heated indirectly in batch or continuous production via heat transfer from virgin aggregate/asphalt part of the composition. The final composition containing RAP, virgin asphalt and rejuvenator should attain a temperature sufficient for proper paving, typically about 150 to about 175° C.

The RAP is typically crushed and sieved before it is recycled with asphalt rejuvenator. The asphalt rejuvenator reinvigorates the sieved RAP allowing a well blended uniform and consistent product.

In preparing the paving composition of the present invention one prepares the asphalt rejuvenator by blending the styrenic block copolymer, linseed oil or linseed oil blend, and the antioxidant system. It is important that the asphalt rejuvenator be made first, and not made in-situ by adding the oil, styrenic block copolymer and antioxidant system to a hot virgin asphalt. Then about 15 to about 25 wt. % asphalt rejuvenator is blended with about 75 to about 85 wt. % virgin pitch. Typically prior to introduction of the asphalt rejuvenator the virgin asphalt is about 160° C. to about 190° C. and more preferably 180-200° C. The virgin asphalt is in a heated tank and the asphalt rejuvenator is introduced into the heated tank and well mixed. Once this mixture is substantially uniform in composition, it is crosslinked either by adding sulfur or a sulfur compound, or by increasing the temperature and stirring for 10 to 30 hours at about 200° C. After the mixture is crosslinked, then it is mixed with virgin aggregates and RAP. Then it is spread on the surface and compacted as is commonly known in pavement production.

The present invention also encompasses hot in-place-recycling of road surfaces, where the road surface is milled, heated, mixed with virgin hot mix asphalt, asphalt rejuvenator, and placed back on the road in one continuous operation. It is then compacted shortly after it is placed on the road. The asphalt rejuvenator could be added into the recycled mixture, in-situ during the continuous operation in the field, carried with virgin hot mix asphalt added to the recycled mix to correct gradation or carried via rejuvenating emulsion.

The present invention also provides bituminous emulsions having an increased degree of storage stability compared to other known bituminous emulsions. The bituminous emulsions of the present invention are particularly useful in a variety of road and paving applications including fog seal, rejuvenator seal, scrub seal, prime coat, tack coat, chip seal, slurry seal, micro surfacing, and in central-plant or in-place recycling (cold in-place recycling, cold central plant recycling, full depth reclamation, hot in-place recycling). With regard to the present invention, preferably the bituminous emulsions will be used as pavement surface treatments for sealing and repairing roads, drive ways, parking lots and other black topped surfaces, as well as in recycle applications. As used throughout the present specification, the phrase "bituminous emulsions" is intended to also include bituminous dispersions.

The bituminous emulsions of the present invention comprise a bitumen component that may be any naturally occurring bitumen or derived from petroleum. In addition, petroleum pitches obtained by a cracking process and coal tar can be used as the bitumen component as well as blends of various bitumen materials. Examples of suitable components include, but are not limited to, distillation or "straight-run bitumens", precipitation bitumens (e.g. propane bitumens), blown bitumens (e.g. catalytically blown bitumen), multigrades, and mixtures thereof. Other suitable bitumen components include, but are not limited to mixtures of one or more of these bitumens with extenders (fluxes) such as petroleum extracts, e.g. aromatic extracts, distillates or residues, or with oils. Suitable bitumen components (either "straight-run bitumens" or "fluxed bitumens") are those having a penetration of in the range of from about 25 to about 400 units at 25° C.; therefore quite hard bitumens of a penetration of from about 60 to about 70 units may be used, but generally a straight run or distilled bitumen having a penetration from about 110 to about 250 units will be the most convenient to use.

The water that is utilized in the emulsions of the present invention is preferably demineralized water since minerals in other types of water can adversely react with the emulsion system.

In addition to bitumen, water and polymers, one or more emulsifier systems are added to the emulsions of the present invention. As used herein, the phrase "emulsifier system(s)" includes a system that contains one or more emulsifiers alone, one or more emulsifiers in combination with a mineral acid or one or more emulsifiers in combination with a base. Depending upon the type of emulsion desired (cationic, anionic or nonionic) the emulsifier(s) will be selected from: (a) for cationic emulsions, salts of fatty amines, amido amines and imidazolines (or from mixtures comprising members of two or more families noted for cationic emulsions or mixtures of two or more emulsifiers within each family noted for cationic emulsions), with amido amines such as Redicote® E9 (commercially available from Akzo Nobel) and Dinoram S (commercially available from Ceca (of France)) being the most preferred and (b) for anionic emulsions, salts of fatty acids, rosin acids, lignin sulphonates, bentonites and clays (or from mixtures comprising members of two or more families noted for anionic emulsions or mixtures of two or more emulsifiers within each family noted for anionic emulsions), with oleic acid being the most preferred. In the case of cationic emulsions, when amido amines are utilized, they must be mixed and reacted with a mineral acid, e.g. hydrochloric acid, nitric acid, phosphoric acid or sulfuric acid, to attain water solubility. Furthermore, in the case of anionic emulsions, typically bases such as sodium hydroxide are used to attain water solubility.

The bituminous emulsions of the present invention can be manufactured using any of the methods known in the art for manufacturing bituminous emulsions such as by using colloidal mills or high shear mixers in a continuous process. The emulsions of the present invention can be prepared by mixing a bitumen component with an emulsifier solution containing one or more emulsifier systems. The bitumen component is prepared by blending bitumen with the block copolymer composition of the present invention. The success of the final emulsion is not dependent upon the type of tank (or vessel) utilized to prepare the bitumen component of the present invention. Accordingly, any known tank or vessel utilized in the preparation of bitumen compositions can be used provided that such tank or vessel has stirring (agitation) and heating capabilities. As used within the scope of the present invention, the phrase "stirred tank" refers to such tanks and vessels that have stirring (agitation) and heating means. Suitable stirring or agitation includes, but is not limited to, vertical impellers, side-arm impellers and pump around circulation. In terms of carrying out the process, the bitumen component is typically placed in the stirred tank and gradually heated to the desired temperature. In the case of the present invention, the bitumen will typically be heated to a temperature from about 145° C. to about 220° C., preferably from about 165° C. to about 185° C. The bitumen component is typically stirred or agitated during this heating phase. While the presence of air is not detrimental to the process of the present invention (i.e., the use of an open air vessel which results in the surface of the mixture coming in contact with air), the intentional introduction of air (as in the case of air curing or blown bitumen) is not necessary to the process of the present invention and is in fact discouraged since such addition would most likely result in the hardening of the bitumen component.

Once the bitumen component has reached the desired temperature, the asphalt rejuvenator is added while the bitumen/rejuvenator mixture is being stirred in order to form a homogeneous mixture. The bitumen/rejuvenator mixture is conducted at a temperature of about 180 to 220° C. for about 30 minutes to about 4 hours. Then about 0.05 to about 1.0 wt. % cross-linker, based on 100 wt. % of the bitumen/asphalt rejuvenator is added to crosslink the polymer. About 50 to 72 wt. % of the crosslinked bitumen/rejuvenator is emulsified with 50-28 wt. % water/emulsifier. The water/emulsifier contains about 0.1 to about 3 wt. % emulsifier.

The emulsifier solution can be prepared by simply adding one or more emulsifying system components (emulsifiers and mineral acid in the case of cationic emulsions, and emulsifiers and bases in the case of anionic emulsions) to water and heating the mixture to allow dissolving. Once the bitumen cross-linked rejuvenator component and emulsifier/water solution are prepared, they are mixed together, e.g. by being fed in separately but simultaneously into a colloid mill. The temperature of the bitumen component and emulsifier solution will vary depending upon the grade and percentage of bitumen in the emulsion, the type of emulsifier, etc. Generally, the bitumen component temperatures upon addition will be from about 120° C. to about 160° C., preferably from about 135° C. to about 150° C., even more preferably about 145° C. although when high levels of polymer are used, it may be desirable to use slightly higher temperatures. The temperature of the emulsifier/water solution upon addition to the mixture will typically be from about 30° C. to about 60° C., preferably about 45° C. to about 50° C. The two phases (bitumen/crosslinked rejuvenator component and emulsifier/water solution) are mixed together, e.g. in the colloid mill they are subjected to intense shearing forces which cause the bitumen to break into small globules. The individual globules are then coated with the emulsifier which gives the surface of the droplets an electrical charge (in the case of anionic or cationic emulsifiers) and the resulting electrostatic forces prevent the globules from coalescing. While the asphalt rejuvenator emulsion has many uses due to its viscosity characteristics, certain applications such as fog seal call for a sprayable liquid composition. These applications typically dilute the emulsion with water, such as a 1:1 asphalt rejuvenator emulsion to water mixture. The present invention can also be further diluted with water. Moreover, the asphalt rejuvenator emulsion of the present invention can be initially made with more water.

Generally, the bitumen emulsions of the present invention contain from about 50% to about 75% by weight, preferably 55% to 70% by weight, of dispersed phase, i.e. the bitumen plus rejuvenator (plus any other additives like cross-linker), and 50 to 25% by weight, preferably 30% to 45% by weight, of water or aqueous phase, i.e. the water plus emulsifier system(s) and any other additives (said amounts based on the total of 100% of dispersed phase plus aqueous phase). To cover a fog seal application, as mentioned above, the amount of the aqueous phase can be doubled, for example beyond that mentioned herein.

The dispersed phase of the emulsion generally will contain from about 88 wt. % to about 75 wt. %, preferably from about 83 wt. % to about 77 wt. % bitumen, and from about 11 wt. % to about 24 wt. %, preferably from about 16 wt. % to about 22 wt. % of the asphalt rejuvenator, and about 0.05 to about 1 wt. % crosslinker, preferably about 0.4 to about 0.6 wt. % crosslinker.

The water or aqueous phase of the emulsion will contain from about 0.1 wt. % to 3 wt. %, preferably from about 0.2% to about 2.5% by weight, of one or more emulsifier systems as defined hereinbefore, and from about 0.35% to about 0.6% by weight, preferably from about 0.45% to about 0.55% by weight, of a mineral acid or base, and the remainder water (about 96.4 wt. % to about 99.5 wt. % water, said amounts based on the total of 100% of emulsifier system(s), mineral acid or base, and water).

The sulfur-donor crosslinking agent which is employed to produce a crosslinked polymer/bitumen composition can be composed of a product chosen from the group formed by elemental sulfur, hydrocarbyl polysulphides, sulfur donor vulcanization accelerators or mixtures of such products with one another and/or with vulcanization accelerators which are not sulfur donors. In particular, the sulfur donor coupling agent is chosen from the products M, which contain, by weight, from 0% to 100% of a component CA composed of one or more sulfur-donor vulcanization accelerators and from 100% to 0% of a component CB composed of one or more vulcanizing agents chosen from elemental sulfur and hydrocarbyl polysulphides, and the products N, which contain a component CC composed of one or more vulcanization accelerators which are not sulfur donors and a product M in a ratio by weight of the component CC to the product M ranging from 0.01 to 1 and preferably from 0.05 to 0.5.

The elemental sulfur capable of being employed for constituting, partially or entirely, the coupling agent is advantageously sulfur in flower form and preferably sulfur crystallized in the orthorhombic form and known by the name of alpha sulfur.

When the coupling agent contains a sulfur-donor vulcanization accelerator, the latter may be chosen in particular from the thiuram polysulphides. As examples of such vulcanization accelerators are the compounds: dipentamethylenethiuramdisulphide, dipentamethylenethiuram tetrasulphide, dipentamethylenethiuram hexasulphide, tetrabutylthiuramdisulphide, tetraethylthiuram disulphide and tetramethylthiuram disulphide.

The amount of free sulfur representing 0.05 wt. % to 20 wt. % and preferably 0.1 wt. % to 10 wt. % of the weight of the styrenic block copolymer described above, is used in the preparation of the polymer/bitumen composition crosslinked by the sulfur coupling agent.

EXAMPLES

Example 1

Viscosity Profiles

Figure 1:
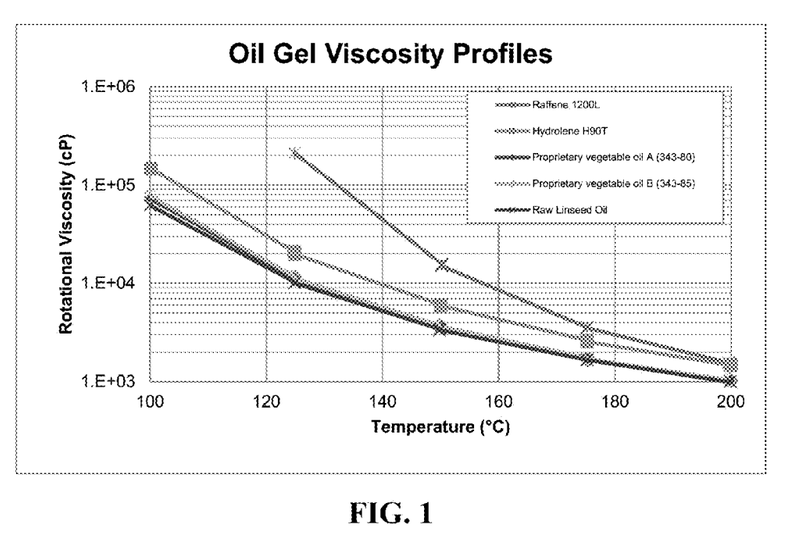
FIG. 1 is a graph of viscosity (in centipoise) versus temperature in ° C. illustrating various oil gel viscosity profiles.

FIG. 1 represents viscosity profiles for the compatible oil gel formulation made from various oils at 60% wt. and the styrenic block copolymer described herein at 40% wt. The formulation was prepared in low shear mode at 180° C. over a period of approximately 1 hour.

Petroleum Based Oils

Both Hydrolene and Raffene oils are derived from petroleum. Raffene oil gel has shown higher susceptibility to temperature than Hydrolene oil gel. This result was expected since Raffene is a naphthenic oil and Hydrolene a paraffinic oil. Naphthenic oils have lower viscosity index making them more susceptible to temperature change. These are not suitable oils for the present invention.

Bio-Based Oils

Oil gel formulation was attempted with corn oil, soybean oil, raw linseed oil and two proprietary vegetable oils. The 40% wt. of the styrenic block copolymer described herein was attempted to fully dissolve in various bio-based oils (60 wt. %).

Raw linseed oil and the two proprietary vegetable based oils were the only oils that produced homogenous and compatible blends with styrenic block copolymer at 40% polymer loading. Corn oil and soybean oils were both incompatible at 40%. Corn oil was also tested at 20% polymer loading and resulted in incompatible blend.

FIG. 1 is a graph of viscosity (in centipoise) versus temperature in ° C. illustrating the various asphalt rejuvenators (oil gels) tested.

Example 2

It has been determined that 40 wt. % styrenic block copolymer in oil was an optimal concentration based on suitable viscosity and ease of preparation. This is a minimum amount.

The oil gel is prepared by blending polymer into oil at elevated temperatures (~180° C.). Additionally, it may be shipped and/or introduced into asphalt in its liquid state, which requires the material to remain hot. Therefore, it is necessary to know how the oil gel behaves when kept in its liquid form for an extended time period.

It is well known that bio-based oils, such as raw linseed oil, contain a significant amount of unsaturated carbon double bonds. Exposing bio-based oil to elevated temperatures for long periods of time causes stiffening and subsequent polymerization of the oil.

Bio-based oil polymerization has a negative effect of hot storage stability of the oil gel. The following example shows the positive effect of antioxidant package on the rotational viscosity of hot stored oilgel.

Introduction of Anti-Oxidant Package

Table 1 (having an asphalt composition with no antioxidant) was compared to Table 2 composition containing antioxidant. The same styrenic block copolymer for both compositions was that described herein. To retard oxidation of polymer or oil in the oil gel two anti-oxidants were introduced (see Table 2), each at 1% of total weight of oil-gel replacing 2% by weight oil linseed oil:
Irgafos 168
Ethanox 330
The blends were prepared by low shear blending the polymer into linseed oil at 180° C. for 2 hours.

TABLE 1

| (No AO package) | Wt. % |
| --- | --- |
| ADM Linseed Oil | 60% |
| Styrenic block copolymer | 40% |
| Irgafos 168 | 0% |
| Ethanox 330 | 0% |
| Total | 100 wt. % |

TABLE 2

| (AO package) | Wt. % |
| --- | --- |
| ADM Linseed Oil | 58% |
| styrenic block copolymer | 40% |
| Irgafos 168 | 1% |
| Ethanox 330 | 1% |
| Total | 100 wt. % |

Effect of Keeping Oil Gel at Elevated Temperature on its Rheology

Figure 2:
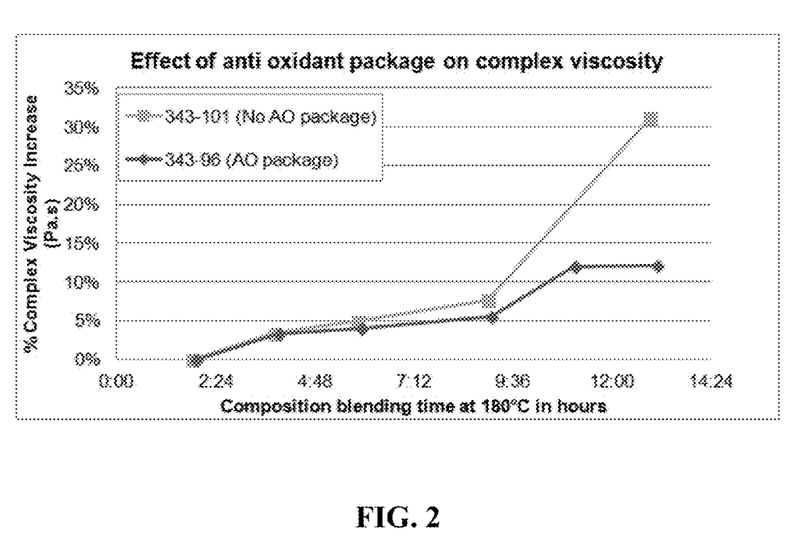
FIG. 2 is a graph of complex viscosity increase in Pa·s versus time in hours with and without an antioxidant package.

At 2 hours the blends of Tables 1 and 2 were completely homogeneous. At that point they were left blending for additional 13 hours at 180° C. See, FIG. 2. At selected times the blends were sampled to measure complex viscosity change.

The data obtained demonstrate that the anti-oxidant package has successfully retarded buildup of complex viscosity, therefore, extending the life of material in melt form.

The antioxidant package, in addition to slowing creep in complex viscosity, also prevented the oil gel from yellowing.

Subsequently the oil gel antioxidant package was optimized. It was discovered that the effects of antioxidant package could be quantified by its ability to retard polymerization on the surface of hot stored oil gel sample. Small can lids were used as aging vessels for the oil gel. Each lid was charged with approximately 4 grams of one of the oil gels containing different antioxidant packages. Each oil gel had three samples. These samples were then put in a hot oven at 180° C. for 10, 40 and 60 min. in order to capture the period of time during which the skin formed on the surface.

Skin buildup became visible after 40 minutes of aging on all samples. Sample 409-64 featured the most skin buildup and the most discoloration, followed by 409-62 and 409-63. The pattern was repeated for samples conditioned for 60 min. It became apparent that the amount of skin formation was strongly associated with loss of tackiness as sensed haptically.

Probe Tack Tester PT-1000 was then used to measure tack of the skin formations at various aging times.

Figure 3:
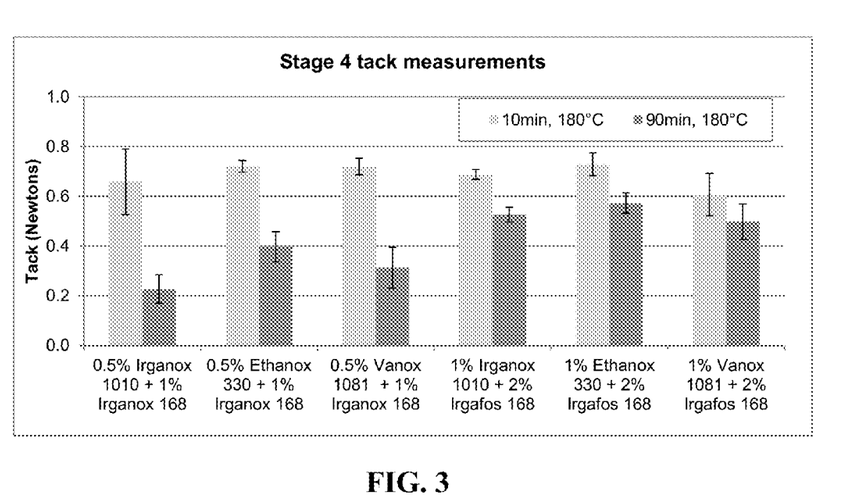
FIG. 3 is a graph of tack in Newtons versus various amounts of various antioxidants after 10 and 90 minutes of hot storage at 180° C.

Further antioxidant package optimization yielded the following combinations of primary and secondary antioxidants as the most effective in retaining the tack on the samples, and therefore retarding the aging. See, FIG. 3. The higher the tack value the more effective the package was in retarding aging at different conditioning times. Based on testing, the most effective primary antioxidants were Ethanox 330, Vanox 1081 and Irganox 1010. The most effective secondary antioxidant was Irgafos 168.

Example 3

Introduction of the Oilgel into Bitumen

The oil gel with the antioxidant package was subsequently blended into PG64-22 bitumen to deliver a blend with 7.5% styrenic block copolymer as described herein. The oilgel was added at 18.75% by total blend weight. See, Table 3 below. It took about 10 minutes for the oil gel cubes (about 1.5"×1.5"×1.5") to be dissolved at 180° C. The polymer was then cured with 0.1% sulfur for 4 hours at 180° C.

Table 3 shows the breakdown of components in the blend excluding sulfur.

TABLE 3

| Example 2 | Percentage (%) |
|---|---|
| PG64-22 | 81.25% |
| styrenic block copolymer | 7.50% |
| Oil | 10.87% |
| AO Package | 0.37% |
| Total | 100% |

Rheological Implications of Bitumen Modification

Figure 4:
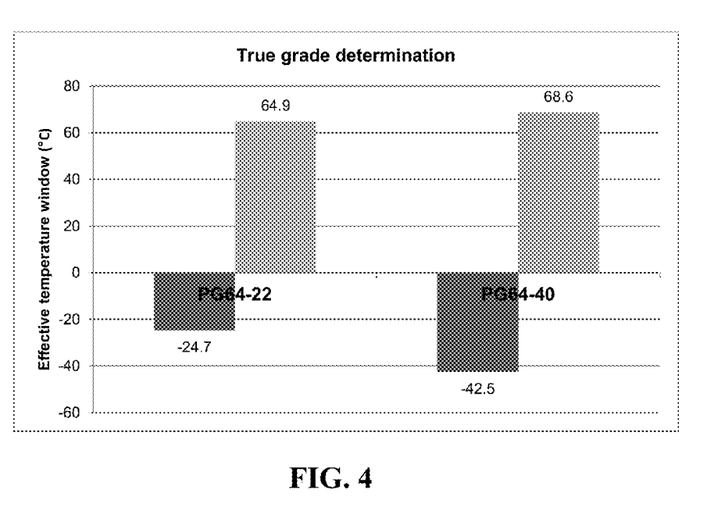
FIG. 4 is a chart illustrating the effect of AASHTO Superpave™ performance grade determination considering effective temperature in ° C. of two typical paving grade asphalts with and without asphalt rejuvenator.

The oil gel modified PG64-22 graded as shown in FIG. 4 and as follows (note that from henceforth the oil gel modified PG64-22 will be referred to as PG64-40):
PG64-22 True Grade: PG 64.9-24.7
PG64-40 (343-111) True Grade: PG 68.6-42.5
High temperature grade was estimated using exponential data fit, while the low temperature PG grade was m-value limited, and was estimated using linear data fit.
The evaluated oil gel has been shown to:
Be sufficiently stable to enable its production and subsequent binder modification
Lower the low temperature PG grade of PG64-22 base binder by 3 grades
Retain and slightly improve the high temperature PG grade
Not cause any abnormal physical hardening behavior.

Example 4

In order to determine the suitability of any asphalt rejuvenator, note that three tests are employed to prove its benefit, namely: 1) the Hamburg Wheel Tracking Test conducted at 50° C., 2) the Flexural Fatigue Test conducted at 25 and 15° C., and 3) the Disc Compact Tension Test conducted at minus 18° C. A composition passing these tests will strike a balance of properties at hot and cold payment conditions.

AASHTO T 324 Hamburg Wheel-Track Testing of Compacted Hot Mix Asphalt (HMA)

Figure 5:
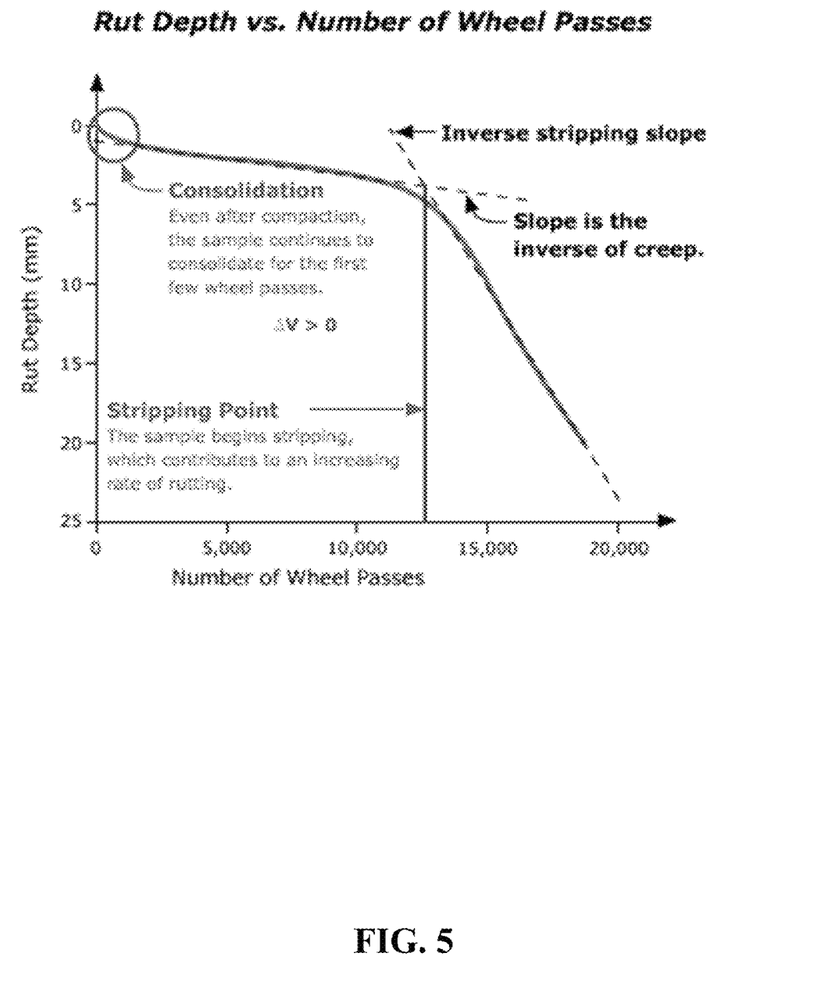
FIG. 5 is a chart illustrating suitability of pavement by plotting rut depth in millimeters versus the number of wheel passes, in accordance with AASHTO T324 Hamburg Wheel—Track Testing of Compacted Hot Mix Asphalt (HMA). While the Figure does not represent any particular example of the invention, it is useful in understanding the concepts of the tests that indicate the recycled asphalt pavement composition is an improvement over the prior art.

The Hamburg Wheel Tracking Device (HWTD), developed in Germany, can be used to evaluate rutting and stripping potential. See, FIG. 5. The HWTD tracks a loaded steel wheel back and forth directly on a HMA sample. Tests are typically conducted on 10.2×12.6×1.6 inch (260×320× 40 mm) slabs (although the test can be modified to use SGC compacted samples) compacted to 7 percent air voids with a linear kneading compactor. Most commonly, the 1.85 inch (47 mm) wide wheel is tracked across a submerged (underwater) sample for 20,000 cycles (or until 20 mm of deformation occurs) using a 158 lb (705 N) load. See, FIG. 6. Rut depth is measured continuously with a series of Linear Variable Differential Transformer LVDTs on the sample.

Figure 7:
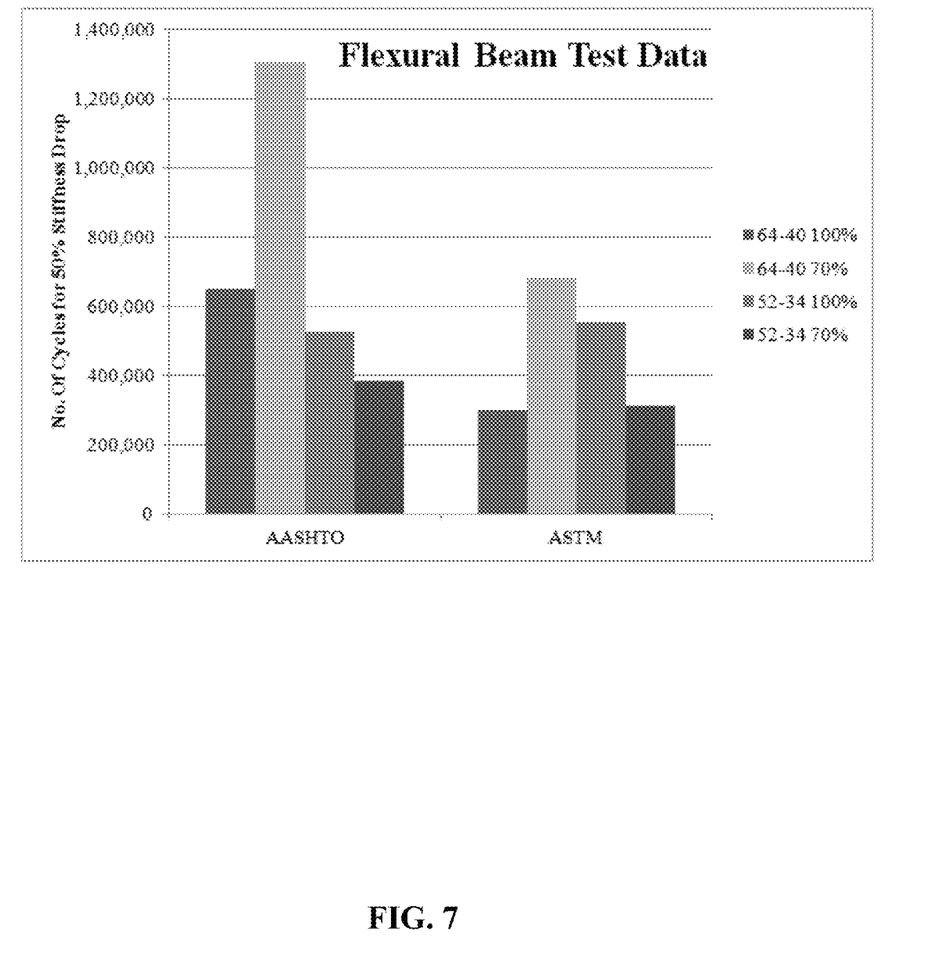
FIG. 7 is the Flexural Beam chart of number of cycles for a drop of 50% stiffness for 4 compositions.

AASHTO T 321: Determining the Fatigue Life of Compacted Hot-Mix Asphalt (HMA) Subjected to Repeated Flexural Bending Small HMA beams (15×2×2.5 inches (380×50×63 mm)) are made and placed in a 4-point loading machine, which subjects the beam to a repeated load. Tests can be run at a constant strain level or at a constant stress level. Testing time is dependent on the strain level chosen for the test. High strain (400-800 microstrain) may be completed in a few hours. Low strain tests (200-400 microstrain) can take several days. Even lower strain levels (50-100 microstrain) can take upwards of a month. Typically 8 to 10 samples are used to develop results for any mix. Hence, it may take several days to several weeks to develop sufficient fatigue data to allow analysis of a given mixture. Condition the beams at the test temperature (typically 68° F. (20° C.)) for two hours. Select a strain level that will provide an estimated 10,000 load cycles before the initial stiffness is reduced to 50 percent or less. The test should be terminated when the beam has reached a 50 percent reduction in stiffness. See, FIG. 7.

Disk Compact Tension Test

The Disk Shaped Compact Tension test (DCT) was developed at the University of Illinois. It determines the fracture energy (Gf) of asphalt-aggregate mixtures. The test geometry is a circular specimen with a single edge notch loaded in tension. The fracture energy can be utilized as a parameter to describe the fracture resistance of asphalt concrete, with a high Gf value being more desirable. DCT test specimens can be prepared from 150-mm gyratory compacted samples or field cores. Sample preparation involves sawing and coring operations. First, a water-cooled masonry saw is used to create flat, circular faces of a 50-mm wide specimen. A marking template is then used to indicate the location of the 1-inch loading holes to be drilled, and a water-cooled drilling device is then used to fabricate the loading holes. Next, a masonry table saw is used to produce the final two cuts: a flattened face to facilitate the placement of the CMOD gage and a notch, which is a necessary feature of a true fracture mechanics based test. This geometry has been found to produce satisfactory results for asphalt mixtures with nominal maximum aggregates size ranging from 4.75 to 19 mm. The DCT test is run in crack mouth opening displacement (CMOD) control mode at a rate of 1 mm/min. This quick loading rate essentially removes any creep behavior of the mixture during the test. Typically, specimens are completely failed in the range of 1 to 6 mm of CMOD travel after approximately 5 minutes of testing time. Fracture energy is essentially the area under the Load vs. CMOD curve, and a high Gf indicates a greater resistance to thermal cracking.

Example 5

Virgin/RAP, asphalt rejuvenator compositions were prepared having the following characteristics: aggregate having a final mix gradation meeting AASHTO hot mix asphalt (HMA) gradation requirements. There are a few standards for certain road types. For example, the standard for interstate roads is different than for lightly traveled roads. For this example the aggregate gradation is shown in Table 4.

TABLE 4

| Sieve Size (mm) | % Passing by Weight |
|---|---|
| 19 | 100 |
| 12.5 | 94 |
| 9.5 | 86 |
| 4.75 | 62 |
| 2.36 | 35 |
| 1.18 | 25.5 |
| 0.6 | 17.5 |
| 0.3 | 10.9 |
| 0.15 | 7.2 |
| 0.075 | 4 |

The compositions contained approximately 6 wt. % of virgin and RAP asphalt and 94 wt. % of aggregate. A typical standard is for a composition having a PG 52-34 (control) and the preferred composition of this invention is a PG 64-40 (meaning it is graded to be functional at 64° C. to minus 40° C.). Some state standards count the amount of RAP at 100% and other states count the amount of RAP at 70%. This means a 50-50 mixture of virgin and RAP asphalt being 5 wt. % of the composition, the RAP asphalt counts either 100% or 70%. Of course the virgin asphalt always counts as 100%. So when the RAP asphalt count 100%, it is 2.5 wt. % of the composition, the virgin asphalt is 2.5 wt. % of the composition, and the aggregate is 95 wt. %. When the RAP asphalt counts 70%, it actually count as 0.7 times 2.5 wt. % or 1.75 and thus the virgin asphalt then must make up the difference to obtain 5 wt. % of the composition, i.e. 3.25 wt. %. Thus both PG 52-34 (control) and PG 64-40 were tested at 100% and 70%.

Figure 6:
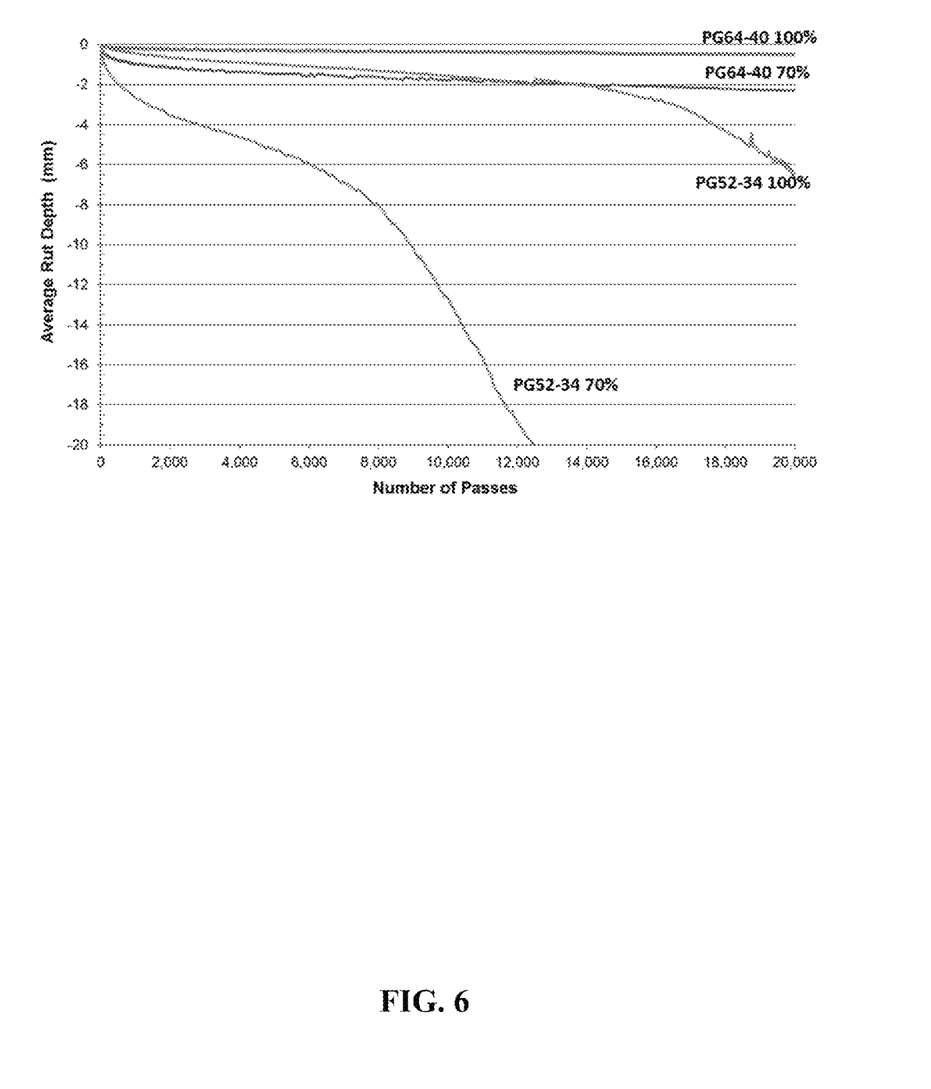
FIG. 6 is a chart illustrating the rut depth in millimeters versus the number of passes of the Hamburg Wheel Test for 4 compositions.

For the Hamburg Wheel Test, the results are set forth in FIG. 6. As can be observed, PG 64-40 at both 100% and 70% had superior average rut depth at about 2 mm or less. The test was conducted at a temperature of 50° C.—well within the range of both PG grades. The superior results stem from the asphalt rejuvenator composition that was only present in the PG 64-40 grade.

For the Flexural Beam Test, the same PG 52-34 and PG 64-40 compositions as set forth above were employed. Both compositions were tested at 25° C. and 15° C. The results are set forth in Tables 5-7, where Tables 5 and 6 comprise the 25° C. data and Table 7 comprises the 15° C. data.

TABLE 5

| Specimen No. | No. of Cycles to 50% | AASHTO | R2 | ASTM | R2 | Air Voids |
|---|---|---|---|---|---|---|
| 64-40 100% | | | | | | |
| 1 | 780,760 | 1,424,918 | 0.48 | 575,232 | 0.67 | 8.69 |
| 2 | 98,700 | 230,129 | 0.24 | 149,364 | 0.30 | 8.71 |
| 3 | 175,720 | 288,126 | 0.62 | 173,184 | 0.82 | 7.36 |
| Average | 351,727 | 647,724 | 0.45 | 299,260 | 0.59 | |
| 64-40 70% | | | | | | |
| 1 | 792,520 | 1,583,573 | 0.36 | 805,571 | 0.66 | 6.57 |
| 2 | 878,040 | 1,375,753 | 0.52 | 762,707 | 0.83 | 5.81 |
| 3 | 622,320 | 958,888 | 0.63 | 809,262 | 0.87 | 5.86 |
| 4 | 858,260 | | 0.35 | 349,732 | 0.77 | 5.43 |
| Average | 787,785 | 1,306,071 | 0.47 | 681,818 | 0.78 | |

TABLE 6

| Specimen No. | No. of Cycles to 50% | AASHTO | R2 | ASTM | R2 | Air Voids |
|---|---|---|---|---|---|---|
| 52-34 100% | | | | | | |
| 1 | 284,160 | 377,838 | 0.73 | 743,644 | 0.68 | 8.23 |
| 2 | 475,580 | 671,466 | 0.54 | 363,291 | 0.71 | 7.17 |
| Average | 379,870 | 524,652 | 0.63 | 553,467 | 0.69 | |
| 52-34 70% | | | | | | |
| 1 | 185,950 | 319,629 | 0.74 | 431,543 | 0.76 | 5.22 |
| 2 | 236,090 | 414,964 | 0.63 | 225,281 | 0.83 | 6.11 |
| 3 | 391,290 | 433,445 | 0.70 | 584,652 | 0.68 | 4.98 |
| Average | 271,110 | 389,346 | 0.69 | 413,825 | 0.76 | |

TABLE 7

| Specimen No. | No. of Cycles to 50% | AASHTO | R2 | ASTM | R2 | Air Voids |
|---|---|---|---|---|---|---|
| 64-40 100% | | | | | | |
| 1 | 108,840 | 140,142 | 0.78 | 92,580 | 0.94 | 8.26 |
| 2 | 225,790 | 279,252 | 0.81 | 218,824 | 0.95 | 7.37 |
| 3 | 110,960 | 150,863 | 0.70 | 76,239 | 0.89 | 8.4 |
| 4 | 224,060 | 289,746 | 0.68 | 133,746 | 0.89 | 8.02 |
| Average | 167,413 | 215,000 | 0.74 | 130,348 | 0.92 | |
| 52-34 100% | | | | | | |
| 1 | 44,810 | 53,093 | 0.90 | 41,977 | 0.94 | 8.11 |
| 2 | 78,030 | 93,714 | 0.88 | 65,365 | 0.95 | 7.38 |
| 3 | 72,040 | 85,396 | 0.90 | 73,864 | 0.99 | 8.6 |
| Average | 64,960 | 77,401 | 0.89 | 60,402 | 0.96 | |

For the Disk Compact Tension Test (tested at −18° C.) the data is reported in Table 8. Note that the PG 64-40 grade was superior to the PG 52-34 control. And in both the control and PG 64-40 grade, the 70% count provided the best results over the 100% count.

TABLE 8

| ID | 64-40 100% | | 64-40 70% | | 52-34 100% | | 52-34 70% | |
|---|---|---|---|---|---|---|---|---|
| | Air Voids | Energy | Air Voids | Energy | Air Voids | Energy | Air Voids | Energy |
| I 1-1 | 8.08 | 721.84 | 7.86 | 792.72 | 7.96 | 624.58 | 6.99 | 634.43 |
| I 1-2 | 7.38 | 866.09 | 7.54 | 708.52 | 7.98 | 494.30 | 7.80 | 568.79 |
| I 2-1 | 7.12 | 707.53 | 7.86 | 703.44 | 7.76 | 440.80 | | |
| I 2-2 | 7.34 | 746.34 | 7.29 | 561.35 | 8.17 | 595.86 | | |
| II 1-1 | 8.08 | 547.78 | 7.86 | 706.45 | 8.17 | 489.74 | 7.37 | 562.20 |
| II 1-2 | 7.89 | 650.97 | 7.28 | 624.70 | 8.35 | 498.49 | 7.46 | 437.65 |
| II 2-1 | 7.84 | 462.08 | 7.93 | 795.74 | 8.70 | 465.11 | 7.50 | 658.33 |
| II 2-2 | 7.81 | 533.42 | 7.60 | 737.19 | 8.12 | 470.38 | 7.57 | 733.31 |
| Average | 7.69 | 654.51 | 7.65 | 703.76 | 8.15 | 509.91 | 7.45 | 599.12 |

In summary, both specimens for the Hamburg Wheel Test and Disk Compact Tension Test indicate both PG 64-40 grades were superior to the controls and overall the 70% count for PG 64-40 gave the best balance of properties. See Table 9

TABLE 9

| Specimen | Hamburg | DCT |
|---|---|---|
| 64-40 100% | 0.51 | 654.51 |
| 64-40 70% | 2.29 | 703.76 |
| 52-34 100% | 6.45 | 509.91 |
| 52-34 70% | 20 | 599.12 |

Example 6

The following Table 10 shows viscosity data for 81.25% PG58-28 +18.75% Rejuvenator combination. Such combination contains 7.5% polymer and due to low viscosity could be easily emulsified using industry standard bitumen emulsification methods.

TABLE 10

| Viscosity [cP] | % Torque | Shear Rate [1/s] | Temperature [° C.] |
|---|---|---|---|
| 80 | 1.2 | 7.0 | 200 |
| 100 | 1.5 | 7.0 | 190 |
| 131 | 2.0 | 7.0 | 180 |
| 173 | 2.6 | 7.0 | 170 |
| 239 | 3.6 | 7.0 | 160 |
| 365 | 5.5 | 7.0 | 150 |
| 518 | 7.8 | 7.0 | 140 |
| 848 | 12.8 | 7.0 | 130 |
| 1534 | 23.1 | 7.0 | 120 |
| 2997 | 45.1 | 7.0 | 110 |
| 6797 | 102.4 | 7.0 | 100 |

Thus it is apparent that there has been provided, in accordance with the invention, a composition for making an oil gel rejuvenator for use with RAP, and a RAP composition containing rejuvenator that fully satisfies the objects, aims and advantages set forth above. Moreover an asphalt rejuvenator emulsion containing bitumen, crosslinker, water and emulsifier is also part of the present invention. While the inventions have been described in conjunction with specific embodiments, it is evident that many alternatives, modifications and variations will be apparent to those skilled in the art in light of the foregoing description. Accordingly, the present inventions are intended to embrace all such alternatives, modifications and variations as fall within the spirit and broad scope of the appended claims.

The invention claimed is:

1. An asphalt rejuvenator comprising:
    59-33 wt. % of a bio-based oil capable of fully dissolving at least 40 wt. % styrenic block copolymer,
    40-65 wt. % styrenic block copolymer comprising a mixture of: a) styrene butadiene diblock and b) styrene butadiene triblock and/or multiarm block copolymers, and
    1-2 wt. % of an antioxidant system,
    wherein said bio-based oil or bio-based oil blend has flash point ≥230° C. and the styrene butadiene block copolymer is a mixture of diblock and triblock and/or multiarm styrenic block copolymers where the diblock to triblock and/or multiarm block ratio is greater than 1:1, and the viscosity of the asphalt rejuvenator gel at 180° C. is a maximum of 2000 cP when measured at 6.8/seconds shear rate.

2. The asphalt rejuvenator of claim 1, wherein said antioxidant system is a combination of primary and secondary antioxidants.

3. The asphalt rejuvenator of claim 2, wherein said primary antioxidant is a hindered phenol or arylamine, and said secondary antioxidant is phosphites and/or thiosynergists.

4. The asphalt rejuvenator of claim 1, wherein said bio-based oil is linseed oil or a blend of linseed oil and one or more other oils.

5. The asphalt rejuvenator of claim 4, wherein said linseed oil has about 6 to about 9 wt. % saturated fatty acid and about 10 to about 22 wt. % mono-saturated fatty acids.

6. The asphalt rejuvenator of claim 1, wherein said styrenic block copolymer comprises:
    (i) a diblock copolymer comprising one block of a monoalkenyl arene and one block of a conjugated diene having a peak molecular weight from 30,000 to 78,000 and a vinyl content from 35 to 80 mol percent based on the number of repeat monomer units in the conjugated diene block, and
    (ii) a block copolymer comprising at least two blocks of monoalkenyl arene and at least one block of conjugated diene, the block copolymer selected from the group consisting of linear triblock copolymers having a peak molecular weight that is 1.5 to 3.0 times the peak molecular weight of the diblock copolymer, multiarm coupled block copolymers having a peak molecular weight that is 1.5 to 9.0 times the peak molecular weight of the diblock copolymer, and mixtures thereof, wherein each block copolymer has a vinyl content from 35 to 80 mol percent based on the number of repeat monomer units in the conjugated diene block, wherein the melt index for the styrenic block copolymer is from about 20 g/10 min. to about 35 g/10 min. as determined by ASTM D-1238, condition G (200° C., under 5 kg load), and wherein the ratio of (i) to (ii) in the styrenic block copolymer is greater than 1:1.

7. A recycled asphalt pavement composition comprising: asphalt rejuvenator, virgin asphalt, and RAP and/or RAS, wherein said asphalt rejuvenator comprises bio-based oil or a bio-based oil blend capable of supporting at least 40 wt. % styrene butadiene block copolymer and an antioxidant system, said styrene butadiene block copolymer comprises:
    (i) a diblock copolymer comprising one block of a monoalkenyl arene and one block of a conjugated diene having a peak molecular weight from 30,000 to 78,000 and a vinyl content from 35 to 80 mol percent based on the number of repeat monomer units in the conjugated diene block, and (ii) a block copolymer comprising at least two blocks of monoalkenyl arene and at least one block of conjugated diene, the block copolymer selected from the group consisting of linear triblock copolymers having a peak molecular weight that is 1.5 to 3.0 times the peak molecular weight of the diblock copolymer, multiarm coupled block copolymers having a peak molecular weight that is 1.5 to 9.0 times the peak molecular weight of the diblock copolymer, and mixtures thereof, wherein each block copolymer has a vinyl content from 35 to 80 mol percent based on the number of repeat monomer units in the conjugated diene block, wherein the melt index for the styrene butadiene block copolymer is from about 15 g/10 min. to about 50 g/10 min. as determined by ASTM D-1238, condition G (200° C., under 5 kg load) and wherein the ratio of (i) to (ii) in the styrene butadiene block copolymer is greater than 1:1.

8. The recycled asphalt pavement composition of claim 7, wherein said antioxidant system and is a combination of primary and secondary antioxidants.

9. The recycled asphalt pavement composition of claim 7, wherein said bio-based oil is linseed oil or linseed oil blend has flash point ≥230° C.

10. The recycled asphalt pavement composition of claim 7, wherein said asphalt rejuvenator has a maximum viscosity at 180° C. of 2000 cP when measured at 6.8/seconds shear rate.

11. The recycled asphalt pavement composition of claim 7, further including a crosslinker.

12. The recycled asphalt pavement composition of claim 11, wherein said crosslinker is sulfur or sulfur based.

13. The recycled asphalt pavement composition of claim 7, wherein said asphalt rejuvenator comprises 59-33 wt. % bio-based oil or bio-based oil blend, 40-65 wt. % styrene butadiene diblock and triblock and/or multiarm block copolymers, and 1-2 wt. % of an antioxidant system.

14. The recycled asphalt pavement composition of claim 7, contains about 35 to about 65 wt. % RAP and/or RAS, and from 65 to 35 wt. % virgin asphalt, (pitch and sand/aggregate), without considering rejuvenator.

15. The recycled asphalt pavement composition of claim 7, contains about 15 to about 25 wt. % asphalt rejuvenator is blended with about 75 to about 85 wt. % RAP/RAS/virgin asphalt.

16. A method of making a recycled asphalt pavement composition, comprising:
preparing an asphalt rejuvenator by uniformly blending 60-35 wt. % bio-based oil or a bio-based oil blend, 40-65 wt. % styrene butadiene block copolymer, wherein said bio-based oil or bio-based oil blend has a flash point >230° C. and can support 40 wt. % styrene butadiene block copolymer, and an antioxidant system, said asphalt rejuvenator at 180° C. has a maximum viscosity of <2000 cps when measured at 6.8/seconds shear rate, and said styrene butadiene block copolymer comprises:
i) a diblock copolymer comprising one block of a monoalkenyl arene and one block of a conjugated diene having a peak molecular weight from 30,000 to 78,000 and a vinyl content from 35 to 80 mol percent based on the number of repeat monomer units in the conjugated diene block, and
(ii) a block copolymer comprising at least two blocks of monoalkenyl arene and at least one block of conjugated diene, the block copolymer selected from the group consisting of linear triblock copolymers having a peak molecular weight that is 1.5 to 3.0 times the peak molecular weight of the diblock copolymer, multiarm coupled block copolymers having a peak molecular weight that is 1.5 to 9.0 times the peak molecular weight of the diblock copolymer, and mixtures thereof, wherein each block copolymer has a vinyl content from 35 to 80 mol percent based on the number of repeat monomer units in the conjugated diene block, wherein the melt index for the styrene butadiene block copolymer is from about 15 g/10 min. to about 50 g/10 min. as determined by ASTM D-1238, condition G (200° C., under 5 kg load) and wherein the ratio of (i) to (ii) in the styrene butadiene block copolymer is greater than 1:1; and
blending said asphalt rejuvenator with hot virgin asphalt and RAP and/or RAS.

17. The method of claim 16, wherein said RAP ranges from about 1 to about 2 wt. parts while said virgin asphalt ranges from about 2 to about 1 wt. parts respectively, based on the total amount of asphalt.

18. The method of claim 16, wherein said blending step contains about 15 to about 25 wt. % asphalt rejuvenator blended with about 75 to about 85 wt. % RAP/virgin asphalt.

19. The method of claim 16, wherein said step of blending comprises blending said asphalt rejuvenator with said virgin asphalt, and then blending in said RAP and/or RAS.

20. A continuous method of using hot-in-place reclaimed road surface, comprising the steps of:
milling the aged road surface,
heating the milled, aged road surface,
mixing the heated, milled, aged road surface with virgin hot mixed asphalt and asphalt rejuvenator as claimed in claim 1, and
placing the heated, milled, aged road surface with asphalt rejuvenator back on the road in one continuous operation, said asphalt rejuvenator mixed into the heated, milled, aged road surface in-situ during the continuous operation in the field, carried with virgin hot mix asphalt added to the heated, milled aged road surface.

21. An emulsion comprising:
from about 50 to about 75 wt. % of a dispersed component, and
from about 25 to about 50 wt. % of an emulsifying component,
said dispersed component containing about 11 to about 24 wt. % of the asphalt rejuvenator of claim 1, and about 0.05 to about 1.0 wt. % of a crosslinker, and the remainder being bitumen, wherein said dispersed component is 100 wt. %, and said emulsifying component containing 0.1 to about 3.0 wt. % of an emulsifier and the remainder being water, based on 100 wt. % of the emulsifying component.

22. The emulsion of claim 21, wherein said emulsion is diluted with additional water.

* * * * *